Jan. 30, 1945. G. A. LYON 2,368,254
WHEEL STRUCTURE
Filed Jan. 7, 1944 5 Sheets-Sheet 1
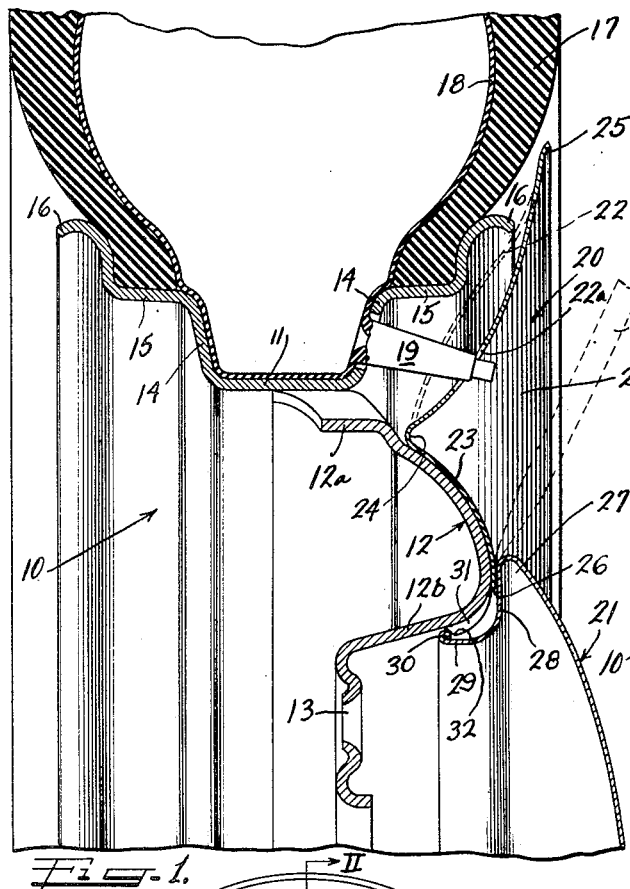
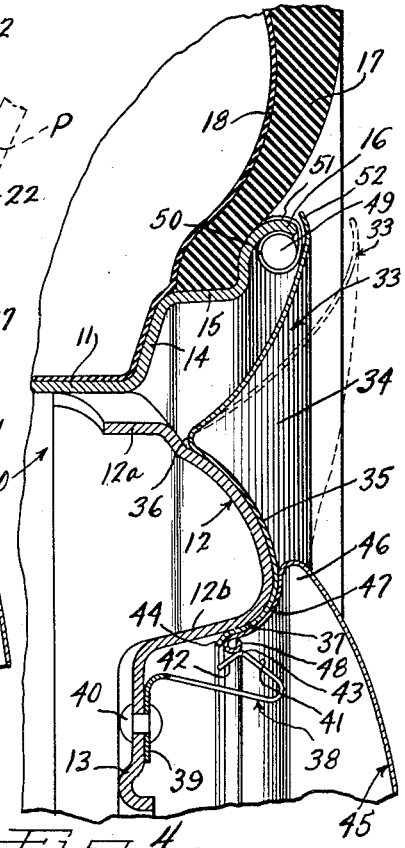
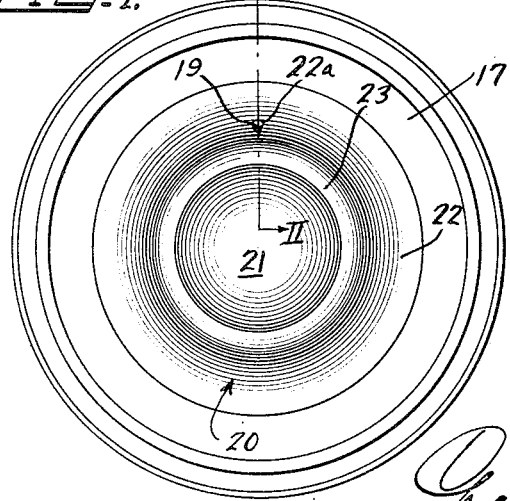
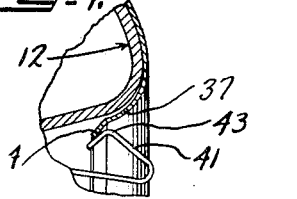
Inventor
GEORGE ALBERT LYON

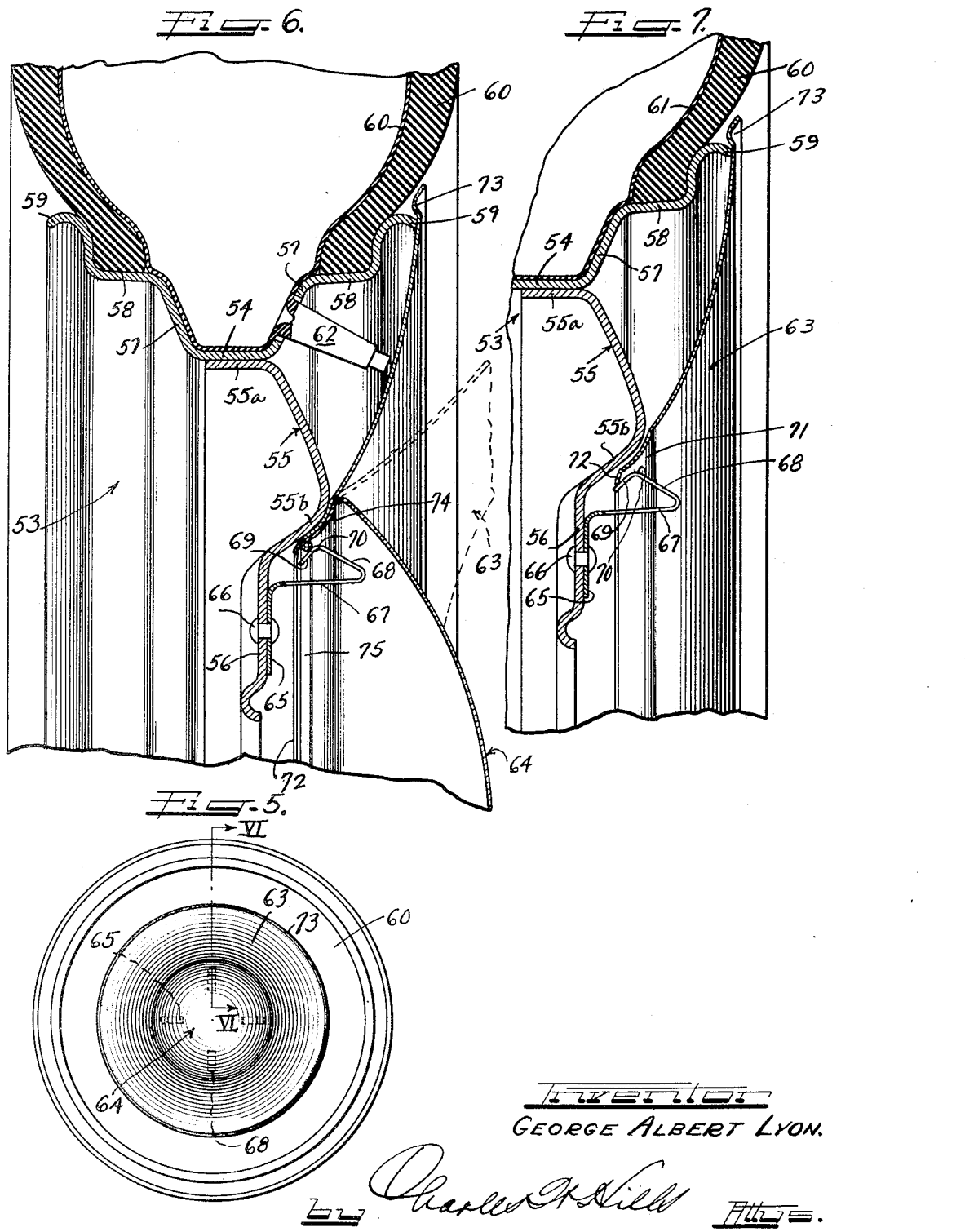

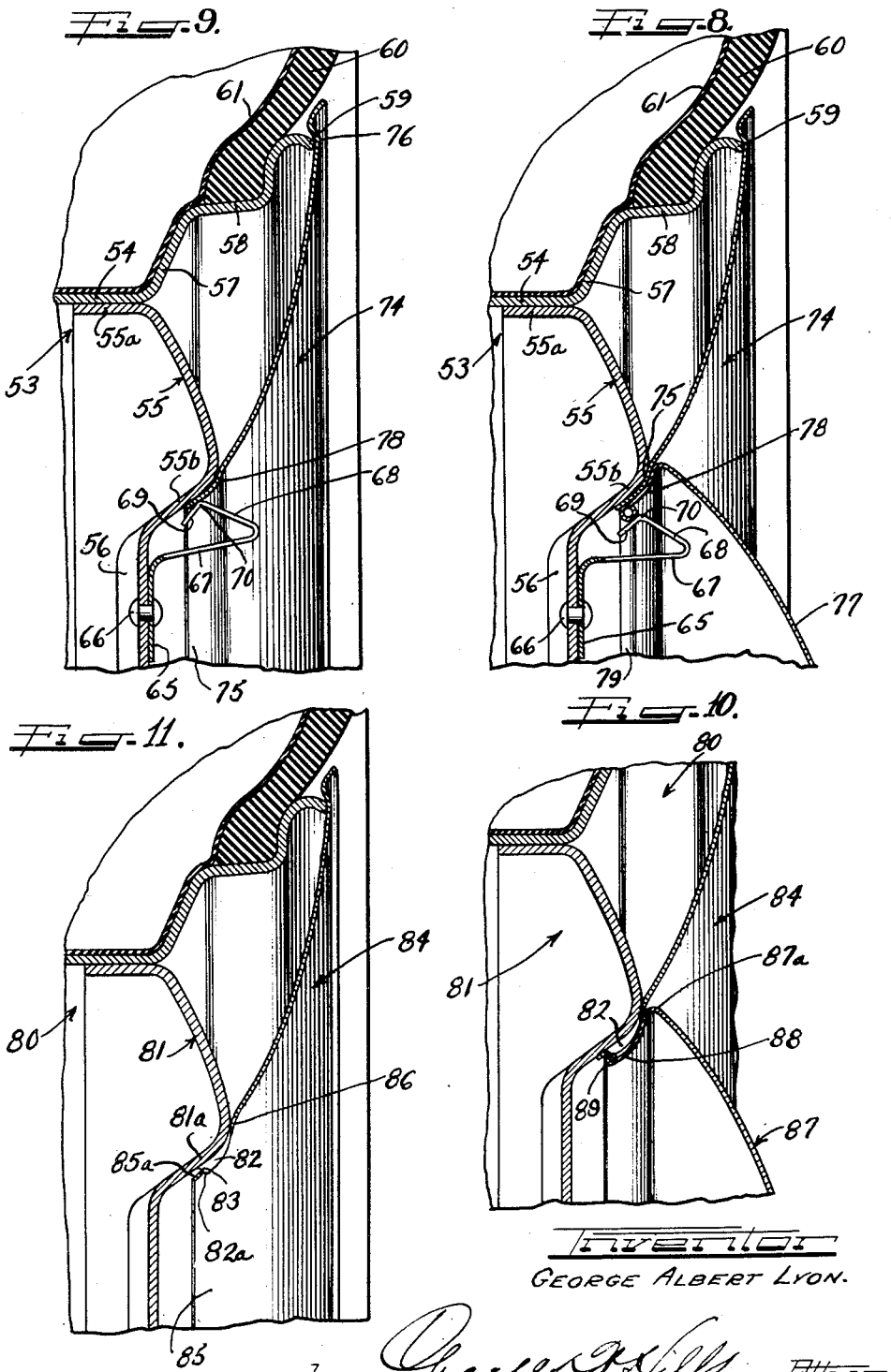

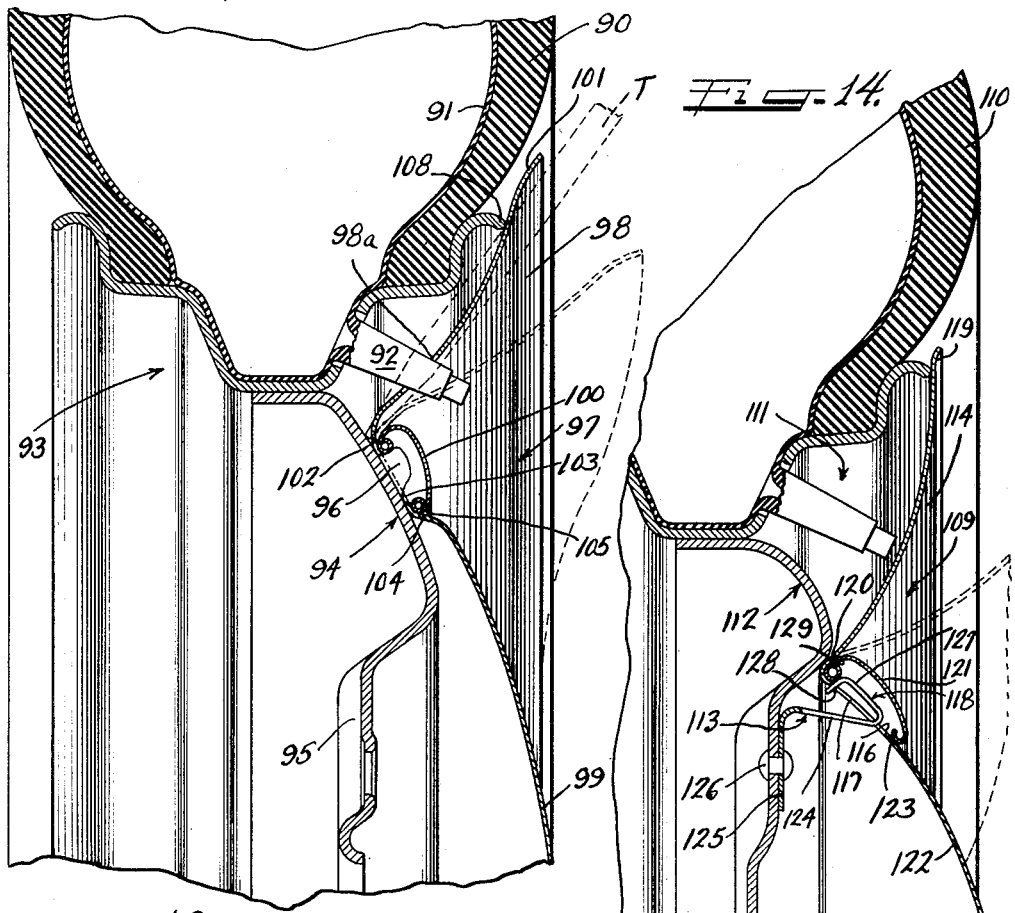

Jan. 30, 1945.　　G. A. LYON　　2,368,254
WHEEL STRUCTURE
Filed Jan. 7, 1944　　5 Sheets-Sheet 5
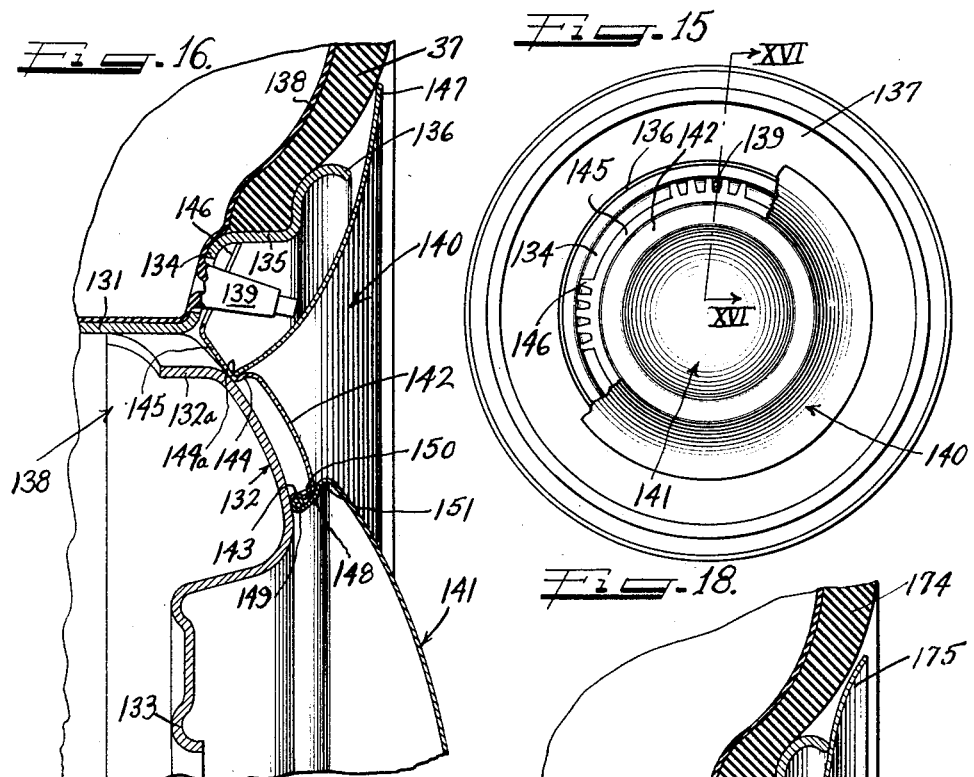
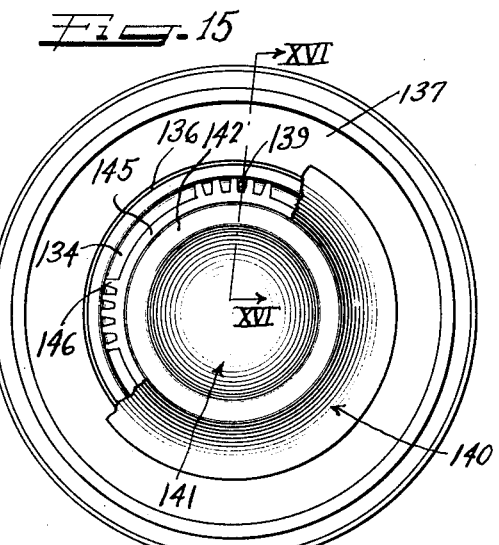
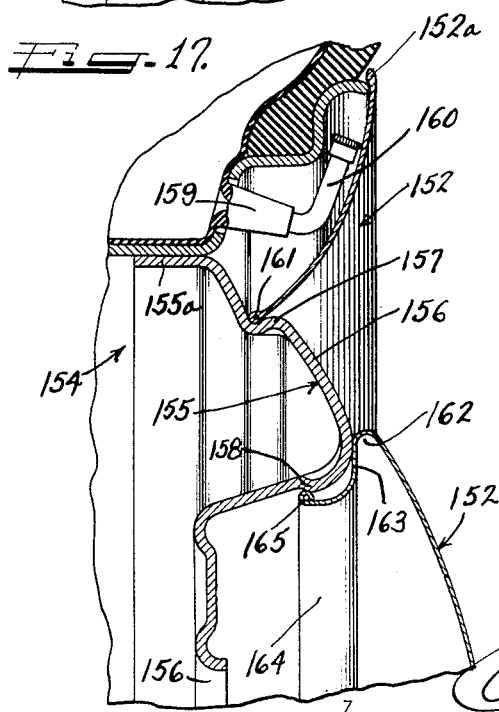
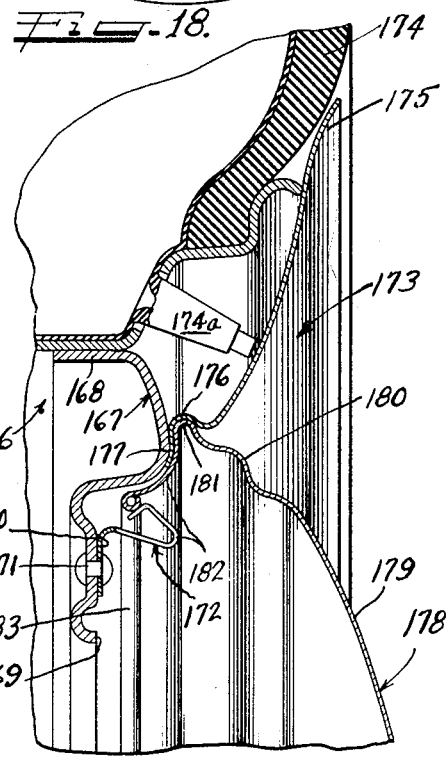
Inventor
GEORGE ALBERT LYON Patented Jan. 30, 1945

2,368,254

UNITED STATES PATENT OFFICE 2,368,254

WHEEL STRUCTURE

George Albert Lyon, Allenhurst, N. J.

Application January 7, 1944, Serial No. 517,324

37 Claims. (Cl. 301—37)

This invention relates to a wheel structure, and more particularly to ornamental wheel trim or covers for automobile wheels.

The subject matter of this application has been carved from a number of my co-pending applications, including the following: Serial No. 474,647, filed February 4, 1943; Serial No. 477,001, filed February 25, 1943; Serial No. 478,400, filed March 8, 1943; Serial No. 479,980, filed March 22, 1943; Serial No. 484,136, filed April 23, 1943; Serial No. 494,303, filed July 12, 1943; Serial No. 496,892, filed July 31, 1943.

Cetrain of the figures and accompanying descriptive matter hereof has been divided from said applications as all of such forms have common novel features; all forms hereof embracing a wheel trim made of a synthetic plastic material.

An object of this invention is to provide a wheel trim for a wheel which may be either in the form of a ring or a disk and which is of a highly simple construction and lends itself to economical manufacture on a large production basis, such as is required in the automotive industry.

It is an important object of the present invention to provide for disposition over the outer side of a wheel structure having a tire rim and a central load bearing portion or body part, a circular cover including a radially outer annular part constructed from synthetic plastic sheet material whereby it is self-sustaining as to form and yet may be locally, resiliently, temporarily flexed either by accidental distorting pressures or by intentional distortion to render wheel parts accessible, thereafter to immediately, resiliently snap back into its initial configuration when the distorting pressures are relieved therefrom.

Another object of this invention is to provide a plastic wheel trim either in the form of a disk or a ring which will inherently adjust itself to manufacturing variations in the contour and relative position of the wheel members or parts embraced by the trim.

A still further object of the invention relates to the provision of a wheel trim made of a synthetic plastic material which is generally form sustaining but yet resiliently deflectable without any deleterious permanent distortion.

Another object of the invention is to provide a plastic wheel trim which may be in any one of a number of different forms, but in each of which the trim covers the exposed wheel rim flanges and at least part of the wheel body, and in such a manner that the trim upon being positioned against the wheel gives way to adjust itself to manufacturing variations in the shape of the rim and body members of the wheel and to variations in the shape of the plastic member itself.

Yet another object of the invention relates to the provision of a central plastic wheel trim having a free outer manually flexible lip for affording access to the rear side thereof and yet not requiring removal from the wheel in order to enable flexing of the lip.

A further object of the invention relates to the provision of a plastic trim with a free outer lip and a rigidifying central clamp-on portion for retaining the trim on the wheel.

A still further object of the invention relates to the provision of a synthetic plastic wheel trim which has a flexibly pivotal outer portion which in the use of the trim on a wheel tends to move toward the medial plane of the wheel by centrifugal force, thus causing the trim to closely hug the wheel.

A further object of the invention relates to the provision of a plastic wheel trim having a portion which is flexible to permit of access to parts therebehind, such as a valve stem or balancing weights, without requiring removal of the trim from the wheel and also permits access to the rear face of the trim for washing or the like without requiring removal thereof from the wheel.

An additional object of the invention is to provide wheel trim in a number of different forms, in each of which the configuration is such as to cause the trim to lend itself admirably to many different desirable ornamental effects.

Another object of this invention relates to the provision of a plastic wheel trim in a number of different forms, in each of which the trim may be very simply attached to the wheel in snap-on, clamping relationship by means of a snap-on hub cap or clamping ring which attaches to the wheel body of the wheel, utilizing either spring clips or projections on the wheel for detachably holding the clamping medium.

Yet another object of the invention relates to the provision of plastic trim in a plurality of different forms, in each of which the trim includes an outer annular portion or part of such radial width and configuration as to cause it to appear to be a continuation of the curved outer side wall of the tire, whereby the tire appears to extend clear down to the wheel body and thus giving the tire on the wheel a massive-looking appearance with a relatively small central ornamental closure.

In accordance with the general features of this invention there is provided in a wheel structure including a wheel body and a multi-flange rim adapted to receive a tire, a trim or cover for on outer side of the flanged rim and at least a part of the wheel body member, comprising an annular resilient angularly flexible portion made of a form sustaining plastic which is of such depth as to conceal the exposed side flanges of the rim, the outer edge of the annular portion being free and terminating adjacent the side wall of the tire carried by the rim so as to be deflectable away from the tire; said portion also having provided an inner part or portion bearing and being retained on the wheel body axially inwardly of the rim so that the annular cover portion in use appears to be a continuation of the curved side wall of the tire.

A further feature of the invention relates to the provision in a structure of the aforementioned character of such an arrangement of the portions or parts of the trim or cover that upon the trim being pressed against the wheel body by a clamping instrumentality such as a snap-on hub cap or ring, the trim gives away to adjust its shape to that of the parts of the wheel embraced thereby so that the trim in effect finds its own position and may thus change its shape under resilient pressure, thus insuring a tight anti-rattle fit on the wheel.

An additional feature of the invention relates to the provision of a cover structure of the aforementioned character which lends itself to being either in the form of a ring or disk and which covers the tire rim flanges and at least a part of the wheel body, and wherein the clamping medium, such as the ring or hub cap may be easily snapped into retaining engagement with either springs or protuberances on the wheel.

Yet another feature of the invention relates to the forming of the outer annular portion of the aforementioned cover in such a manner that access may be had to the valve stem of the tire by either flexing the outer edge of the outer portion downwardly or by pushing in a part of this portion directly in the vicinity of the valve stem.

Yet another feature of the invention relates to the forming of the central or inner part of the aforementioned cover in such a manner that it tends to rigidify the cover and thus provide a pivotal point for the outer flexible free portion, the central portion being in some forms of the invention constructed so as to extend around the nose of the wheel body or spider member for detachable engagement therewith under the compressive force of a hub cap or snap-on ring member.

A further feature of the invention relates to a cover of the aforementioned character and wherein the outer and inner portions are concentric and wherein each of these portions by reason of their generally angular relationship to each other, as well as their inherent resiliency, may adjust the cover to variations occasioned in the manufacture of the wheel, the trim itself, or an associated hub cap.

Other objects and features of this invention will more fully appear from the following detailed description taken in connection with the accompanying drawings which illustrate a number of embodiments thereof, and in which Figure 1 is a side elevational view of one form of the invention;

Figure 2 is an enlarged fragmentary cross-sectional view taken on the line II—II of Figure 1 looking in the direction indicated by the arrows, and showing the details of the trim which has been carved out of my copending application Serial No. 478,400, the dotted illustration of the cover showing the manner in which a portion of the cover may be flexed in order to afford access to the valve stem of the tire, there also being shown in dotted lines the application of a pry-off tool to the central hub cap;

Figure 3 is a fragmentary cross sectional view similar to Figure 28 showing a modification of the structure of Figure 2 and wherein the central portion of the trim extends around the nose of the wheel body or spider into the area of the retaining elements, the dotted lines illustrating the manner in which the outer edge of the cover may be manually flexed away from the wheel in order to afford access to the rear of this cover portion for the purpose of getting to the wheel weights or valve stem;

Figure 4 is a fragmentary detail cross-sectional view showing the manner in which the trim or cover of Figure 3 is centered and held on the wheel by the hub cap retaining elements prior to the application of the clamp-on hub cap to the wheel;

Figure 5 is a side elevational view showing another form of the invention;

Figure 6 is an enlarged fragmentary cross-sectional view taken on the line VI—VI of Figure 5 looking in the direction indicated by the arrows, and showing a further modification of the general type of cover shown in Figure 3, the dotted lines illustrating the manner in which the outer annular portion of the trim may be manually flexed to afford access to the valve stem;

Figure 7 is a fragmentary cross-sectional view of the structure shown in Figure 6 with the hub cap omitted and showing the contour of the inner portion of the cover prior to its deflection by the clamp-on pressure exerted by the retaining hub cap;

Figure 8 is a fragmentary cross-sectional view similar to Figure 6 illustrating a slightly different form of central construction for the plastic trim;

Figure 9 is a sectional view similar to Figure 8 with the hub cap omitted and, as in the case of Figures 4 and 7, showing how the retaining elements or spring clips center and support the plastic trim prior to the application of the retaining member or hub cap;

Figure 10 is a fragmentary sectional view similar to Figure 8 and showing the use of protuberances on the wheel body instead of spring clips for holding the plastic trim and the hub cap on the wheel;

Figure 11 is a fragmentary sectional view similar to Figure 10 with the hub cap omitted, and showing how the plastic trim or cover is centered and held on the wheel by the wheel protuberances prior to the application of the hub cap thereto;

Figure 12 is a side elevational view showing a modification of the invention;

Figure 13 is an enlarged fragmentary cross-sectional view taken on the line XIIII—XIII of Figure 12, clearly showing the contour of the one-piece disk-like plastic cover, and also showing the outer portion of the cover in dotted position to which it may be manually flexed for the purpose of permitting the introduction of a pry-off tool therebehind, such tool likewise being shown in dotted lines; this form of the invention having been carved from my copending application Serial No. 494,303;

Figure 14 is a fragmentary cross-sectional view similar to Figure 13 and showing the use of spring clips instead of protuberances on the wheel body for holding the cover and the clamping ring in place on the wheel;

Figure 15 is a side elevation showing a modified form of the invention, partly broken away to show the arrangement of retaining spring fingers at four corners of the retaining ring;

Figure 16 is an enlarged fragmentary cross-sectional view taken on the line XVI—XVI of Figure 15 and showing the contour of this multiple part or cover wherein the outer part is made of plastic and the inner retaining part is made of metal; this form of the invention having been carved from my co-pending application Serial No. 479,980;

Figure 17 is a fragmentary cross-sectional view of a modified form of plastic trim ring similar to that shown in Figure 16 wherein the trim ring is resiliently pressed over retaining shoulder means on the wheel body; this form of the invention having been carved from my co-pending application Serial No. 474,647; and Figure 18 is a fragmentary cross-sectional view of still another form of the invention wherein the trim ring is elastically snapped over the outer margin of the hub cap from the rear side thereof so as to be carried by the hub cap; this form of the invention having been carved from my co-pending application Serial No. No. 496,892.

As shown on the drawings:

It should be noted at the outset that in all forms of the invention the trim embraces an outer annular part or portion made of plastic material such as a synthetic plastic. Excellent results may be obtained by the use of a synthetic plastic such as ethyl cellulose, it being necessary, however, that the plastic material that is used be generally form sustaining and yet resiliently deflectable without permanent deformation so that the trim or cover may be held under tension on the wheel and may, as described hereinafter, adjust itself to manufacturing variations in the parts of the wheel embraced by the trim or cover.

Attention is also directed to the fact that in any manufacture of wheels considerable leeway is permitted in the location of the wheel body or spider with reference to the tire rim part of the wheel. For example, there may be relative axial displacement of as much as ⅛ inch between these parts and between the wheel body and the edge portion of the tire rim and thus of the trim contact points of the parts.

Then too, in the blanking of the wheel body or spider wear of the dies will occasion some variations in the shape and thickness of the material of the spider. As noted before, an objective of this invention is to provide a plastic trim or cover which will inherently adjust its shape under pressure or tension so as to readily accommodate such variations and thus enable a snug fit of the trim on the wheel.

The above mentioned improvement is of particular advantage in wheel constructions wherein the plastic cover is provided with an extended surface contact with the adjacent portion of the surface of the wheel body. When, for instance, the plastic circular cover is disposed in supporting, surface engagement with a relatively large circular area of the central portion of the body and is compressed thereagainst by a circular, snap-on hub cap which is detachably engaged with retaining means on the wheel, it will be seen that variations in the shape and thickness of the wheel body and particularly in the surface thereof, variations in the thickness and contour of the engaging portion of the plastic cover and variations in the regularity of the surface of the hub cap might cause an irregular surface contact of the parts rather than complete, well-fitting surface contact which is desired. With my present invention, however, it will be seen that the circular cover may be disposed in surface abutment with a portion of the outer surface of the wheel body whereupon pressure imposed by the associated hub cap when it is snapped on to the wheel causes the resilient plastic cover to conform to the configuration of the adjacent portion of the wheel body, however irregular it might be, this being caused first by the resiliency of the cover and second by the compressible, cushion characteristics thereof. Under such circumstances it will be seen that undulations or irregularities in either of the relatively rigid confining surfaces of the wheel or the hub cap are accommodated by the resilient cover thereby to insure a tight fit and thus secure engagement of the plastic cover on the wheel and of the hub cap with the wheel and furthermore, there is provided between the hub cap and the wheel a cushion which is maintained under a condition of stress or compression, thereby to obviate the development of vibration and rattle between the parts.

It is an important attribute of the present invention to provide for disposition over the outer side of a wheel structure, a circular cover assembly including a part formed from sheet synthetic plastic material or the like, whereby it is flexibly resilient and may be flexed into a cross-sectional contour different from that in which it is initially formed, whereby it may be resiliently distorted from its normal configuration into a condition of stress whereby it conforms to the configuration of the adjacent portion of the surface of the wheel structure to be centered thereon and to be retained thereon securely under a condition of stress. In other words, while the plastic cover is initially in disconformity with the configuration of the portion of the wheel against which it is disposed, it may be flexed by suitable retaining means into conformity with the wheel to augment the attachment thereof and the alignment thereof with the wheel.

Referring to Figures 1 and 2, it will be seen that the wheel structure there shown includes a tire rim 10 having a base flange 11 which may be secured as by welding or riveting or the like to an axially inwardly extending peripheral skirt or flange 12a and a central load bearing body portion or spider 12 of the wheel structure.

The central load bearing portion 12 of the wheel is further provided with an axially inwardly offset bolt-on flange 13 which is arranged to receive wheel bolts whereby the wheel may be secured to a suitable part of the vehicle such as the brake drum or the like.

The tire rim 10 is further provided with opposite side wall flanges 14, opposite intermediate flanges 15 and opposite edge portions 16, between which may be disposed a tire 17 having an inner tube 18 provided with a valve stem 19. The valve stem 19, as will be seen, is aligned with and extends through a suitable aperture in the respective side wall 14, thereby to be accessible for application of the nozzle of an air hose thereto for inflation of the tire.

It will also be seen that the annular portion of the central load bearing body part 12 of the wheel between the flange 12a and the bolt-on flange 13 comprises a generally axially outwardly bulging portion which merges with a generally axially inwardly extending flange 12b adjacent the bolt-on flange 13.

The cover assembly shown herein comprises a radially outer annular part 20 and a central circular hub cap simulating part 21. The part 20 is preferably constructed from sheet synthetic plastic material so as to be self-sustaining as to form and yet resiliently flexible so that it may be locally, temporarily flexed and will immediately snap back into initial configuration when flexing or distorting pressures are relieved therefrom. This annular cover portion 20 includes a radially outer part 22 and a radially inner annular part 23 which is integral therewith, these parts being joined on an annular junction comprising an axially inwardly extending beaded part 24.

The annular cover part 22 is preferably provided with a cross-sectional expanse whereby it extends radially outwardly beyond the edge portion 16 of the tire rim 10 and thus conceals the junction between the tire and the tire rim, and radially inwardly to a point inwardly of the junction between the rim 10 and the central load bearing portion 12, and to a point on the load bearing portion immediately radially outwardly of the annular protrusion thereof. Furthermore, the annular cover part 22 is provided with a cross-sectional configuration whereby it generally simulates the curvature of the side wall of the tire 17, thereby to give the appearance of being a part thereof and to appear as a white side wall of a massive tire mounted upon a wheel structure of minimum dimension, when colored white.

In the foregoing construction it will be seen that the cover part 22 is preferably provided at the radially outer margin thereof with a slightly outwardly turned flange as at 25, thereby to present to the side wall of the tire a smooth non-cutting, non-abrading surface when the tire expands laterally under load bearing conditions with each revolution thereof and thus abuts the margin 25 to urge the same temporarily, axially outwardly.

It will further be seen that the cover part 22 may be provided with an aperture 22a through which the outer end of the valve stem 19 may protrude. With this construction, due to the resiliently flexible characteristics of the cover part 22 it will be seen that the operator, in order to inflate the tire by attachment of the nozzle of an air line to the valve stem 19, need merely apply finger pressure to the cover in the vicinity of the aperture 22a, thereby bulging the same inwardly as shown at dotted lines in Figure 2. This enables sufficient of the outer end of the valve 19 to protrude whereby the nozzle may be easily applied thereto. When the inflating operation is completed the operator merely removes the nozzle from the stem 19, whereupon the adjacent portion of the cover will snap back into the position shown in solid lines in Figure 2.

As shown clearly in Figure 2 the radially inner annular portion 23 of the cover member 20 is shaped to conform generally to the configuration of the adjacent portion of the outer curved surface of the load bearing portion 12 of the wheel, while the axially inwardly extending beaded intermediate portion 24 serves to rigidify the entire cover member 20, particularly at the radially outer margin of the portion 23 thereof which supportingly engages the wheel.

The annular cover portion 23 may be initially provided with the cross-sectional configuration shown in Figure 2 or, if desired, may be provided with a cross-sectional configuration whereby the radially inner margin 26 thereof will be disposed in spaced relationship from the wheel body 12 when the bead 24 is disposed in the position shown. The advantages of this latter construction will be seen presently.

To the end that the cover assembly may be completed and that the cover member 20 may be securely attached in detachable relationship to the wheel structure the central circular hub cap simulating member 21 which may be formed from sheet steel or other relatively rigid material is provided with a radially outwardly extending annular portion 27 terminating in a radially inwardly extending flange 28 which merges with a generally axially inwardly extending snap-on flange 29. The flange 29 is rolled at its edge to provide a snap-on bead 30 which serves as the abutment portion for retaining the cover assembly upon the wheel.

In order that the cover assembly may be detachably secured in snap-on, pry-off relationship to the wheel structure, the central load bearing portion 12 is provided at the axially outer part of the flange 12b with circumferentially spaced, circularly aligned humps 31 having substantially axially inwardly facing cam surfaces for receiving the bead 30. The cam surfaces each terminate in a peak 32, these peaks prescribing a circle having a diameter slightly smaller than that prescribed by the radially outer extremity of the snap-on bead 30. Thus it will be seen that after the cover member 20 has been concentrically aligned with the wheel and disposed substantially in the position shown in Figure 2, the central circular hub cap simulating member may be aligned with the central part of the wheel and urged axially inwardly, whereupon the bead 30, in order to pass over the humps 32 is deflected slightly from its circular position until it is passed inwardly of the humps 32, whereupon it snaps into its circular condition to be detachably maintained upon the wheel structure as shown in Figure 2.

The depth of the flange 29 of the central circular hub cap simulating member 21 is so arranged that when the bead 30 is in the position shown in Figure 2, the flange 28 thereof and particularly the radially outer part of this flange, is drawn tightly against, and in overlapping relationship with the radially inner margin 26 of the plastic cover member 20. Thus, if the cover member 20 and particularly the annular portion 23 thereof is provided with an initial configuration whereby the portion 26 is normally spaced from the adjacent portion of the wheel surface, it will be seen that the cover member 21 engages this portion 26 and draws the same inwardly under tension, whereby the plastic cover and particularly the portion 23 thereof is maintained upon the wheel, in configuration therewith, under a condition of stress. As explained above, in the manufacturing of wheels and covers the tolerances are not precise and certain leeway in dimensions and configurations is found necessary. Accordingly, it will be seen that due to the nature of the plastic cover member 20 it will be forced into conforming configuration with the wheel structure to provide a tight, neat, conforming fit therewith, and at the same time the development of vibration and rattle is prevented due to the slight compressibility of the cover member 20. In this regard it will be seen that the radially inner margin 28 thereof serves admirably as a cushion between the cover 21 and the wheel body part 12.

Thus it will be seen that there is provided herein a circular cover assembly having an outer plastic portion and a central, circular more rigid portion, this cover assembly being secured to the wheel in an improved manner merely by alignment of the plastic portion concentrically therewith and then detachably securing the central cover part to the wheel, the plastic being adapted to conform strictly to the configuration of the wheel to overcome difficulties normally presented by the normally wide manufacturing tolerances observed and also serving to cushion the parts to prevent the development of vibration and rattle therebetween.

In order to remove the cover assembly of Figure 2 from the wheel it will be seen that the operator need merely insert the point of a pry-off tool P behind the radially outwardly extending portion 27 of the cover member 21 and then twist the same or fulcrum the same against the edge portion 16 to draw the cover 21 axially outwardly of the wheel.

In the construction of Figures 3 and 4 the wheel structure is similar to that described in conjunction with Figure 2. In this construction the cover member 33 is similar to the cover member 20 of Figure 2 in that it includes a radially outer side wall simulating part 34 and a radially inner wheel engaging annular part 35, these parts being separated by an axially inwardly extending bead portion 36. The cover member 33, however, differentiates from the cover member 20 of Figure 2 principally in that the radially inner part 35 thereof extends radially inwardly sufficiently far to be enveloped around and inwardly of the axially outer part of the flange 12b of the wheel as shown at 37.

In the wheel construction of Figures 3 and 4 the retaining means on the wheel preferably comprises a plurality of spring clips 38 which emanate axially outwardly from an annulus 39 which is suitably secured as by rivets 40 to the central bolt-on flange 13 of the wheel. These clips 38 terminate in cam faces 41 and 42. The junction of which comprises peaks 43 which extends radially outwardly with respect to the wheel.

As will be seen from Figure 4, the underturned or axially inwardly extending portion 37 of the plastic cover member 33 (this plastic cover member having the attributes described in conjunction with the cover member 20 of Figure 2) is initially configurated with a slightly larger cross-sectional curvature than that of the associated portion of the body part 12 of the wheel structure. Thus when the operator aligns the cover member 23 with the wheel and urges the same axially inwardly, the terminal flange 44 of the cover member engages the cam surfaces 41 of the respective clips 38 to force the clips radially inwardly until the peaks 43 have been passed, whereupon the clips assume the position shown in Figure 4. When in this position it will be seen that the cover tends to assume a spaced relationship with respect to the wheel surface.

Thereafter the operator applies the central circular hub cap simulating cover member shown at 45 to the wheel structure. This cover member 45 is provided with a radially outwardly extending annular portion 46 defined on the axially inner side thereof by a radially inwardly, axially inwardly, curved flange 47 which terminates in a radially inwardly curled bead 48. As the cover member 45 is urged axially inwardly and in concentric alignment with the wheel structure it will be seen that the bead 48 thereof is pressed into the space between the part 37 of the cover member 33 and the respective clips, thereby to spread the same. Under this action, it will be seen from Figure 3 that the radially inner margin of the cover is pressed forcibly, radially outwardly against the adjacent portion of the outer surface of the wheel body part 12 while the respective clips 30 are forced generally, resiliently, radially inwardly, in which position they securely engage the bead 48 of the cover member 45 in detachable relationship when the bead 48 has passed over the respective peaks 43 of the spring clips. When the parts are in their ultimate position as shown in solid lines in Figure 3, it will be seen that the cover member 45 is securely, detachably engaged with the respective spring clips 38 as described above by engagement of the snap-on bead 38 with the respective clips and that the radially inner part of the plastic cover member 33 is forced radially outwardly under a condition of stress and into conformity with the opposed surfaces of the body part 12 of the wheel and the cover member 45. Furthermore, it will be seen that the curvate flange 47 of the cover member 45 pressingly engages the outer side of the adjacent portion of the cover member 33 and forces the same tightly against the wheel body, thereby to conform the same to the configuration of the opposed surface. As explained in conjunction with the construction of Figure 2, the slight compressibility of the resilient plastic cover member 33 results in the provision of a cushion between the metallic hub cap 45 and the metallic wheel body 12, thereby to prevent the development of vibration and rattle between these parts.

It is contemplated that the cover assembly of Figures 3 and 4 will be removed from the wheel in a manner similar to that described in conjunction with Figure 2. In this construction, however, it will be seen that after removal of the cover member 45 by a pry-off operation the operator may grasp the radially outer margin of the annular portion 34 of cover member 33 and draw the same outwardly from the position shown in Figure 4 to release the plastic cover from the wheel.

From Figure 3 the manner in which wheel balancing weights may be attached to the wheel and yet concealed by the cover is shown. While the balancing weights may be any of many types already known and available, there is shown herein a weight 49 held in nested relationship against the radially inner surface of the edge portion 16 of the tire rim 10 by means of a spring member having a part 50 enveloping the weight and a part 51 which resiliently engages over the outer side of the edge portion 16 to clamp the weight thereon. As will be seen, the cover member 33 and particularly the radially outer side wall simulating section 34 thereof terminates radially outwardly in a slightly axially inwardly turned flange 52 which completely conceals the edge portion of the tire rim and thus the wheel balancing weights.

Here again it will be seen that the cover assembly includes a radially inner part 45 and a plastic, radially outer part 33 which is pressed by the aforementioned cover parts tightly into conformity with the adjacent portion of the outer surface of the wheel structure, thereby to provide for the mounting of the plastic cover member under a condition of stress to augment the attached relationship thereof with the wheel and thereby to avoid difficulties heretofore encountered due to irregularities in the configuration of associated parts.

From the dotted line position in Figure 3 it will be seen that the operator has ready access to the rear side of cover member 33 merely by manual manipulation of the radially outer part thereof axially outwardly and that the cover, when so distorted, immediately snaps back to its initial, desired configuration when the distorting pressure is relieved therefrom.

The assembly shown in Figures 5, 6 and 7 is somewhat similar to that shown in Figure 3, in the manner of the attachment of the cover parts to the wheel structure.

In this construction the wheel structure shown includes a tire rim 53 having a base flange 54 which may be secured to the central load bearing body portion or spider 55 by means of welding or riveting or the like, whereby it is attached to the adjacent surface of the axially inwardly extending peripheral flange 55a of the body part. The body part is further provided radially inwardly thereof with a bolt-on flange 56 which is arranged to receive wheel bolts, whereby the wheel may be attached to a suitable portion of the vehicle such as the brake drum or the like.

The tire rim 53 is further provided with opposite side wall flanges 57, opposite intermediate flanges 58 and opposite edge portions 59, between which may be disposed the parts of a tire 60 having an inner tube 61 and a valve stem 62 which, as will be seen, is aligned with and extends through a suitable aperture in the adjacent side wall flange 57.

In this form of my invention the cover assembly includes a radially outer annular cover part 63 which is formed from sheet synthetic plastic material or the like and has the attributes of the plastic covers previously described and a central circular hub cap simulating cover portion 64 which preferably is formed from a more rigid material such as sheet metal or the like. To the end that the cover assembly may be securely maintained upon the wheel structure in detachable relationship thereto, there is provided a retaining member including a radially inwardly extending annular part 65 which may be secured to the bolt-on flange 56 by riveting or the like as shown at 66. The annular member 65 is provided at the radially outer edge thereof with a plurality of circumferentially spaced, circularly aligned, spring arms 67 terminating in bent back portions including fingers 68 and fingers 69. It will be seen that the fingers 68 extend radially outwardly, axially inwardly and thus obliquely while the fingers 69 extend radially inwardly, axially inwardly and thus oppositely obliquely, whereby there is formed on each spring clip member a radially outwardly extending peak 70.

The plastic cover member 63 is provided with a cross-sectional expanse whereby it extends from the edge portion 16 of the tire rim radially inwardly to a point far beyond the junction of the tire rim and the central load bearing portion 55, thereby to provide a broad radial expanse to cover a large part of the radially outer portion of the wheel structure. Preferably the central load bearing portion 55 of the wheel structure is provided with an annular protruding portion 55b which extends axially outwardly a considerable distance from the medial plane of the wheel. The cover member 63 extends radially inwardly to a point where it may engage the outer surface of the protruding annular portion 55b of the wheel in surface engagement in a manner to be explained presently. As will be seen from Figure 7, the portion of the cover member 63 which engages the wheel includes a generally radially inwardly extending curvate flange 71 terminating in a radially inwardly extending bordering flange 72.

It will also be seen that the cover member 63 is provided with a cross-section configuration of such curvature that it generally simulates the curvature of the side wall of the tire 60 and thus, having the broad radial expanse described above and extending to the axially outwardly protruding portion of the portion 55b of the wheel, it will be seen that the plastic cover extends radially inwardly to entirely conceal the tire valve stem 62 to give the appearance of being a massive white side wall on a large tire mounted upon a wheel structure of minimum dimensions.

From Figures 6 and 7 it will be seen that a cover member 63 at the radially outer part thereof is provided with a marginal flange 73 which flares slightly axially outwardly and extends radially outwardly beyond the edge portion 59 of the tire rim 53 to conceal the junction between the tire rim and a tire therein. It will be seen that in forming the flange 73 there is also provided an annular undulation in the cross-sectional expanse of the cover member 63 whereby the radially outer margin thereof is substantially reinforced and strengthened against breakage.

The cover member 64 is provided at the radially outer margin thereof with a radially inwardly, axially inwardly extending curvate flange 74 terminating in a circular, radially inwardly rolled snap-on bead 75. Preferably the flange 74 of the cover member 64 is provided with a curvature similar to the flange 71 of the cover member 63 and the outer side of the protuberance 55b of the central load bearing portion 55 of the wheel, whereby these parts may fit in nested relationship against one another as will be described presently.

Referring particularly to Figure 7, it will be seen that the initial configuration imparted to the plastic cover member 63 is such that when the cover is disposed in concentricity with the wheel and urged axially inwardly thereagainst, the radially outer part thereof abuts the edge portion 59 of the tire rim before the flange 71 is disposed in its nested relationship with the outer surface of the annular protrusion 55b of the wheel. Thus it will be seen that any further axial inward movement of the flange 71 and the radially inner part of the cover member 63 will impose a condition of stress upon the intermediate portion of the cover member and also augment the pressure engagement of the radially outer part thereof with the edge portion 59 of the wheel. Under these circumstances it will be seen that the attachment of the cover member 63 to the wheel structure is greatly augmented and is made more secure.

In attaching the cover assembly to the wheel, the operator merely aligns the cover member 63 concentrically therewith and urges the same axially inwardly until the flange 72 thereof has pressed axially inwardly over the humps 70 of the spring clips. Thereafter the central circular hub cap simulating cover member 64 is aligned concentrically with the wheel and urged axially inwardly whereupon the bead 75 rides along the outer surface of the arms or fingers 68 to flex the arms 67 radially inwardly until the peaks 70 have been passed by the bead, whereupon the clips spring back into the position shown in Figure 6 to maintain the cover assembly upon the wheel structure.

It will be seen that this last movement of the cover member 64 takes place after the cover member 63 is in the position shown in Figure 7. Thus the cover member 64, during its attaching movement onto the wheel structure, engages the adjacent portion of the radially inner part of the cover member 63 to force the same axially inwardly against the wheel structure. This accomplishes two purposes. First, it draws the radially outer part of the cover member 63 more tightly against the edge portion 59 of the wheel and maintains this contact under pressure while also maintaining a condition of stress across the plastic cover member and second, it forces the radially inner surface engaging part of the cover member 63 into tight conforming configuration with the adjacent portion at the outer surface of the wheel even in the presence of slight irregularities which have been experienced in manufacturing the wheel or either of the cover members. Furthermore, the sandwiched relationship of the radially inner part of the cover member 63 between the metallic cover 64 and the metal wheel serves admirably to cushion the metallic parts with relation to one another, thereby preventing the development of vibration and rattle between these metallic parts.

Thus in the construction shown in Figures 5, 6 and 7, the assembly at the extreme radially inner margin of the cover member 63 is normally disposed in spaced relationship from the adjacent portion of the outer surface of the wheel when the radially outer part thereof is brought into abutment with the axially outer extremity of the edge portion 59 of the wheel. Thereafter the cover member 64 is applied to the assembly, thereby urging the radially inner part of the plastic cover member 63 into adjacency with the wheel structure and deforming the radially outer margin thereof around a curved portion of the wheel to obtain a secure, nested relationship between the parts. This construction results in a plastic cover assembly in which the radially outer part of the plastic cover is positively pressed against the adjacent portion of the wheel thereby to considerably resist axial outward or flapping movement of the cover when the vehicle is run at high speeds to rotate the wheel rapidly. At the same time it will be seen that dirt and moisture accumulating behind the cover member 63 will be thrown outwardly by centrifugal force and thus will seep between the cover and the edge portion 59.

In order to remove the cover assembly from the wheel the operator need merely grasp the outer margin of the cover 63 and draw the same outwardly whereby, when it attains the position above in dotted lines in Figure 6, the point of a pry-off tool may be inserted behind the radially outer part of the flange 71 of cover 63 to pry the flanges 71 and 74 and the bead 75 over the hinges 70 of the resilient spring clips. Likewise, the valve stem 62 is rendered accessible by local flexure of the cover 63 to the dotted line position of Figure 6 whereupon the nozzle of the air base is attached to the end of the valve stem.

In the construction shown in Figures 8 and 9, the wheel assembly including the cover engaging clips are identical to the structure shown in Figures 6 and 7 and therefore identical parts are similarly identified.

In this form of my invention the plastic cover member 74 is in the form of an annulus and possesses the attributes of the covers described in conjunction with the previous forms of my invention.

Referring specifically to Figure 8 it will be seen that after the radially inner marginal flange 75 of the cover member 74 has been urged axially inwardly beyond the peaks 70 of the resilient spring clips so that the radially outer portion 76 thereof is in abutting relationship with the edge portion 59 of the wheel, the radially inner portion of the flange 75, which is curvate to fit around the curved portion 55b of the wheel, abuts the adjacent portion of the wheel while the radially outer portion of the flange 75, as shown at 76, is disposed in slightly spaced relationship to the wheel. Thus it will be seen that in its initial configuration the cover 74 is not strictly in conformity with the configuration of the adjacent surface of the wheel. Thereafter, when the operator urges the central hub cap cover member 77 axially inwardly it will be seen that the curvate, radially inwardly, axially inwardly extending flange 78 thereof, supportingly abuts the flange 75 of the cover 74 over the entire width thereof so that when the snap-on bead 79 of the cover 77 is disposed against the terminal fingers 69 of the resilient spring clips, the cover 77 will be drawn tightly axially inwardly so that the curvate flange 78 thereof distorts the radially outer part of the flange 75 of the cover member 74 to press the same into configuration with the wheel.

The foregoing procedure further increases the pressure engagement between the portion 76 of the cover 74 and the portion 59 of the wheel and at the same time imposes a condition of stress upon the body thereof to rigidify the same and augment the attachment thereof to the wheel. Furthermore if any irregularities have occurred in the manufacture of the wheel or in the cover member 77 it will be seen that the pressure engagement from each side of the flange 75 causes the same to conform to the configuration of these irregularities and thus there is provided a neat, nested, secure engagement between the parts which are effectively cushioned to prevent the development of vibration and rattling.

The cover assembly of Figures 8 and 9 may be removed from the wheel structure in the manner described in conjunction with Figure 6 or, if desired, the point of the pry-off tool may be inserted directly behind the radially outer extending part of the cover 77, whereby, when fulcrumed against the edge portion 59 of the tire, the cover will be drawn axially outwardly to release the assembly from the wheel. It will be seen that in the latter procedure the shank of the tool will probably press inwardly and dent the intermediate part of the cover 74, however, this indented portion will immediately snap outward, as previously described, when the distorting pressure is removed therefrom.

In the constructions of Figures 10 and 11, the tire rim 80 is secured to the central load bearing portion 81 in a manner described in conjunction with Figures 6 and 7, the central load bearing portion 81 in this instance being provided with a plurality of circularly aligned, circumferentially spaced protuberances or humps 82, these humps being disposed at the outer side of a generally axially inwardly, radially inwardly, obliquely disposed flange 81a. As will be seen from Figure 10, the humps 82 are each provided with a generally axially inwardly facing cam surface 83.

In the assembly of Figure 10 there is provided a plastic, annular cover member 84 which possesses generally the attributes of the cover 63 of Figures 6 and 7 but which differs therefrom principally in that the radially inner flange 85 thereof is provided with a plurality of circularly aligned, circumferentially spaced apertures 86, these apertures being arranged for alignment with the respective humps or protuberances 82.

The cover assembly of Figures 10 and 11 is completed by the provision of a central circular hub cap simulating member 87 formed from a more rigid material such as sheet metal or the like. It will be understood that in each of the previously described constructions and in the construction of Figures 10 and 11, the central circular hub cap simulating member, if formed from metal, may be formed from stainless steel whereby a high luster may be imparted thereto to greatly augment the ornamental appearance of the entire cover assembly. In the present construction the cover member 87, as in the previous constructions, is provided with a generally curvate, axially inwardly, radially inwardly extending flange 88 terminating in a snap-on bead 89 which defines a circle having a diameter slightly larger than that prescribed by the radially inwardly extending peaks 82a of the humps 82.

In assembling the cover of Figures 10 and 11 to the wheel structure the operator merely aligns the cover 84 concentrically with the wheel and also so that the apertures 86 are each aligned with a respective hump 82. The cover 84 is then urged axially inwardly toward the wheel structure until the radially outer part thereof engages the axially outermost extremity of the tire rim 80, whereupon it will be seen from Figure 10 that the radially inner margin of the flange 85 on the cover member 84 is in relatively close proximity to the adjacent portion of the outer surface of the wheel structure while the radially outer terminal edge thereof is spaced therefrom as at 85a. Thereafter the operator aligns the cover member 87 concentrically with the wheel structure and urges the same axially inwardly until the snap-on bead 89 thereof has passed over the peaks 82a of the humps 82, whereupon the bead 89 comes to rest tightly against the inner cam surfaces 83 of the humps 82 to maintain the cover assembly securely upon the wheel structure in detachable relationship thereto.

By comparing Figures 10 and 11 it will be seen that the plastic cover member 84 is initially provided with a configuration which is in disconformity with that of the adjacent portion of the outer surface of the wheel load bearing portion 81 in that the radially inner margin of the cover 84 extends radially inwardly a greater degree than the adjacent portion of the surface of the wheel. Thereafter the application of the cover 87 to the wheel structure causes the bead 89 to abuttingly engage the portion 85a of the flange 85 on the cover member 84 to distort the same and conform the same to the configuration of the adjacent portion of the wheel. Furthermore it will be seen that the radially outer extremity 87a of the cover member 87 abuttingly engages the radially outer part of the flange 85 of the cover member 84 to distort the same and press it into closer conformity with the configuration of the adjacent surface of the wheel body 81.

Thus in this construction also the plastic cover member is first applied to the wheel structure and disposed in disconformity therewith whereupon the central cover member or other retaining means is urged thereagainst to press the same into conformity with the wheel structure, thereby to conform it to irregularities which might be present with the result that a neat, nested fit between the plastic cover and the wheel is obtained.

It will be understood of course that while there is disposed herein a hub cap member 87 for attaching the plastic cover to the wheel an efficient assembly would result by the use of an ornamental annulus or the like in the place of the cover member 87, this annulus being provided with the necessary snap-on parts for engaging the wheel and also with the necessary radially outer parts for pressingly engaging the adjacent portions of the plastic cover member.

Here again it will be seen that appurtenances housed behind the cover member 84 may be rendered readily accessible by mere manual flexure of the radially outer parts of the cover 84 away from the wheel to provide a space between the same and the tire rim 80.

In order to remove the cover assembly of Figures 10 and 11 from the wheel structure it will be seen that the operator need merely insert a pry-off tool behind the radially outwardly extending portion 87a of the cover 87, whereupon, particularly if the tool is a screwdriver, a mere twisting thereof will cause axial outward movement of the cover member 87 away from the humps 82.

Another attribute of the plastic cover members described in conjunction with the foregoing embodiments of my invention is that, being constructed from a plastic material, a color or hue may be imparted thereto throughout the thickness thereof, whereby scratching or abrasion will not detract from the colorful appearance desired. Furthermore, in all of the constructions shown herein, the plastic cover members may be quickly and easily washed on both the inner and outer surfaces by the flexing manipulations previously described.

In view of the foregoing it will be seen that while the distortion of a margin of the plastic cover member into conformity with the adjacent part of the wheel has been described in conjunction with annular cover members, this principle is well adapted for use with circular or disk-like cover members which entirely conceal the wheel, the distorted part of the cover then preferably being an intermediate annular part of the cover.

It will also be understood that in the previously described constructions those retaining elements on the wheel which are integral therewith may be separate members attached thereto or those which are shown in separate parts may be formed integrally on the wheel.

In the construction shown in Figures 12, 13 and 14, a conventional tire is indicated at 90, this tire having the usual inner tube 91 provided with a valve stem 92 projecting through one of the flanges of the conventional drop-center type of tire rim 93. The tire rim is of a multi-flange type and has a base flange suitably fastened to the usual load bearing part or spider 94 of the wheel. The load bearing part 94 is a dished metallic stamping and has a central dished portion formed to provide the usual bolt-on flange 95 by means of which the wheel may be detachably secured to a suitable portion of a vehicle such as the brake drum or the like.

The wheel is of a conventional construction with the exception of circumferentially spaced, circularly aligned protuberances 96 which will be described hereinafter more in detail and which may constitute integral components of the body part 94 or may be separate pieces of metal welded or otherwise secured to the surface of the body part. These protuberances are cooperable with a cover of the present invention designated generally by the reference character 97 and which will now be described in detail.

The cover of the invention embraces a plurality of sections including an outer annular trim ring section 98, a central hub cap section 99 and an intermediate annular ring or bead section 100. The sections 98 and 99 are integral in that they are formed from a common sheet of material. Excellent results have been obtained by making such a cover of a plastic material, such as for example sheet ethyl cellulose. The material used must have sufficient stability that the cover will retain its shape and use, and yet must be capable of being resiliently, locally, temporarily flexed or distorted without imparting permanent deformation thereto. Another attribute of such a cover is that when temporarily indented or otherwise distorted either to render appurtenances on the wheel accessible or accidentally, the cover immediately snaps back into initial, desired configuration when the distorted pressures are relieved therefrom.

The intermediate ring or bead 100 which is nested in the dished intermediate portion of the cover may be made of sheet metal and may have a high lustrous external finish so as to enhance the appearance of the cover.

The trim ring section 98 which is of such radial depth and contour as to cover the exposed side of the flanges of the wheel rim 93 has an outer marginal portion which extends beyond the rim and is formed into a slightly outwardly turned lip 101 positioned alongside the sidewall of the tire. The overall configuration of this trim ring section is such that if it is given a light or white external finish it will blend in with the tire in such a way as to appear to constitute a white sidewall part of the tire, this white sidewall extending radially inwardly to the lustrous intermediate ring 100.

By reason of the above described resilient physical properties of the material used in the ring section 98, the lip 101 may be manually gripped and pulled away from the tire into a position shown in dotted lines in Figure 13 for the purpose of affording access to the rear side thereof whereby a pry-off tool T may be inserted therebehind for the purpose of prying the cover free of its engagement with the protuberances 96 on the wheel.

As shown herein the trim ring section 98 is provided with an opening 98a through which the valve stem 92 is adapted to extend when the stem is of such a length as to require such an opening. However, if a shorter valve stem is used, access may still be had to the valve stem upon flexure of the outer portion of the trim ring section so that the nozzle of an air hose may be inserted behind the said section and applied to the valve stem without necessitating removal of the cover from the wheel. Upon release of the deflected portion of the trim ring section 98 its lip 101 willl immediately snap back to its original and initial position and against the outer edge of the tire rim 93.

In the construction shown the end of the tire valve stem 92 may be rendered more accessible by flexure of the adjacent portion of the trim ring portion 98 inwardly to provide for greater protuberance of the valve stem during the insertion of the nozzle of an air hose thereon.

The inner portion of the trim ring section 98 is turned radially inwardly at 101 into an intermediate indented annular connecting portion 103 which extends radially inwardly and then axially outwardly into a shoulder 104 which defines a seat for the inner turned edge 105 of the metal bead 100. The slightly turned portion 102 of the cover also defines a seat for the outer turned edge 106 of the metal bead 100 behind which slightly turned portion the end of a pry-off tool T is adapted to be inserted in prying the cover free from the wheel. This is advantageous since this slightly turned portion 102 of the cover is backed up by the metal turned edge 106 of the bead 100 and thus will resist the permanent indenture of the plastic cover.

The outer turned edge 106 of the cover ring 100 is of such a diameter that it is adapted to be cammed over, by reason of its flexible characteristics, into retaining engagement with the undercut outer portion of the protuberances 25 as shown in Figure 13.

Preferably the plastic cover of Figure 13 is provided with an initial cross-sectional configuration where it is in slight disconformity with the outer side of the wheel structure in that the intermediate annular portion 103 thereof is slightly spaced from and at an angle to the adjacent portion of the outer surface of the body part 94 of the wheel when the radially outer part thereof is in adjacency with the axially outer extremity of the tire rim 93. Thus, when the parts are assembled in the position shown in Figure 13, the entire cover will be disposed under a condition of stress and will be forced into conforming configuration with the wheel to accommodate any irregularities formed therein by virtue of the manufacturing operation as described above.

In the application of the cover of Figure 13 to the wheel it is first aligned with the protuberances 96 so that the protuberances project through openings 107 formed in the intermediate section 103 of the cover. After the cover has been positioned with the protuberances extending through these openings, the metal bead 100 is nested in the cover over the indented section 103 and is pressed until its outer turned resilient edge 102 is cammed over the high spots of the undercut outer extremities of protuberances 96. The tension of the turned edge is such that it will force the portion 102 of the cover tightly against the wheel body, by slight deformation thereof, as well as holding the trim ring section 98 with its outer portion tightly against the edge of the rim as indicated at 108.

The removal of the cover, which has already been described, may be easily effected due to the resilient characteristics of the lip 101. It will be noted that after the lip 101 has been released, the cover snaps back to its original shape so that it will not take permanent distortion and will retain its original form.

In Figure 14, there is illustrated a modification of the invention wherein the cover is designated generally at 109. This cover has all of the structural and physical properties of the cover 97 of Figure 13, being made of the same materials as that cover and is applicable to and removable from the wheel in the same manner as the cover of Figure 13. This embodiment of the invention differs principally from that shown in Figure 13 in that a different form of retaining means is attached to the wheel for holding the cover on the wheel.

The wheel includes a tire 110, a drop center rim 111, a wheel body part 112 and spring retaining clips 113 which take the place of protuberances 96 in the construction of Figure 13. The wheel body part 112 is attached to the base flange of the rim 111 to provide a unitary wheel structure. The cover member 109 comprises two plastic circular sections 114 and 115 which are joined together and have a plurality of spaced openings 116 in an intermediate portion 117 thereof through which the extremities 118 of the spring clips 113 project. The outer edge of the trim ring section 114 is turned as at 119 as in the case of the form of the invention shown in Figure 13. This turned portion likewise serves to reinforce the outer edge portion of the cover and provides a flexible lip which may be easily, manually manipulated. The inner portion of the trim ring section 114 is slightly turned at 120 so as to extend under the metal bead 121 and terminates in the intermediate, flat section 117. This intermediate flat section has the openings 116 previously described and merges directly into the axially outwardly crowned portion 122 of the central circular cover part 115, this crowned part being arranged to supportingly receive the radially inner turned back edge 123 of the bead 121.

The outer edge of the bead 121 which is similar to the metal bead 100 in the construction of Figure 13 is adapted to be sprung over the gooseneck-like free extremities 118 of the spring clips 113 arranged circularly about the wheel and through the openings 116 of the cover 109.

The spring clips are all identical in construction. Each of them embodies a generally axially outwardly extending arm 124 formed integrally with an annular portion 125 which is secured to the adjacent portion of the wheel body 112 in any suitable manner such as by riveting as shown at 126. The axially outwardly extending free portions 118 of the spring clips include a resilient arm 127 terminating in an axially inwardly, radially inwardly, sloping cam finger 128. Thus, as in the construction of Figure 13, there is provided a circular arrangement of undercut members into which the relatively rigid edge 120 of the bead 121 is adapted to be snapped when the cover is applied to the wheel.

The application of this cover to the wheel is substantially the same as in the form described in conjunction with Figure 13. The cover is initially aligned with the wheel with the spring clip extremities projecting through the openings 116. Thereafter, the metal intermediate annular bead 121 is pressed axially inwardly over the extremities 118 of the clips until it is in tensioned engagement with the resilient extremities of the clips as shown in Figure 14. In this position the turned edge 129 of the bead 121 bears tightly against the turned portion 120 of the cover to slightly distort the same into conformity with the configuration of the wheel and thus holds the cover tightly against the adjacent portion of the wheel body part 112.

The pry-off operation of this cover is effected by flexing the outer rim section 114 away from the wheel and by inserting a pry-off tool under the turned portion 120 of the cover as in the construction shown in Figure 13.

Thus it will be seen that in this construction there is provided a circular plastic cover member having associated therewith an intermediate, ornamental, rigidifying annular bead, the arrangement being such that the cover and the bead are maintained upon the wheel by the same retaining instrumentality.

From the foregoing it will be seen that in the embodiments of the invention previously described, there is provided for disposition over the outer side of a wheel structure having a drop center type tire rim and a central load bearing portion, a cover assembly including a radially outer annular part formed from resiliently flexible sheet synthetic plastic or the like, this radially outer annular part being arranged to be disposed over the outer side of the flanges of the tire rim to conceal the same and extending axially inwardly to a point beyond the junction between the rim and the body part and into supporting engagement with the wheel structure, this radially outer flexible cover part also being arranged to be flexed outwardly to render the rear side thereof accessible, this flexure taking place thereon in the vicinity of the part which is supported by the wheel at which point a pivotal or bending action occurs. Furthermore, due to the physical properties of this radially outer flexible cover part, it will be seen that during the flexing operation by manual manipulation of the radially outer margin thereof, some of the flexing forces will be imposed at the pivotal point above described while the remainder thereof will be distributed throughout the body of the cover parts thereby to, in a sense, protect the pivot points against fracture and breakage due to fatigue.

In the form of the invention shown in Figures 15 and 16 the wheel assembly includes the drop center type tire rim 130 having a base flange 131 and a central load bearing portion 132 provided with an axially inwardly extending peripheral flange 132a which may be secured to the base flange 131 of the wheel rim by means of riveting or welding or the like. The central load bearing portion or spider 132 of the wheel is further provided at the radially inner part thereof with a bolt-on flange 133 which is adapted to receive wheel bolts whereby the wheel may be secured to a suitable appurtenance of the vehicle such as the brake drum or the like.

The tire rim 130 is further provided with opposite side wall flanges 134, opposite intermediate flanges 135 and opposite edge portions 136, between which may be disposed a tire 137 having an inner tube 138 provided with a valve stem 139. As will be seen from Figure 16 the valve stem 139 is aligned with and extends through a suitable aperture in the respective side wall flange 134, thereby to be accessible for application of the nozzle of an air hose thereto.

The cover assembly of this construction includes a radially outer separate annular cover member 140 and a central circular hub cap simulating cover member 141. As in the previous constructions, the radially outer portion 140 of the cover assembly is preferably formed from sheet synthetic plastic material and has the attributes of the covers previously described, while the central circular hub cap simulating cover portion 141 is preferably formed from sheet stainless steel or the like. However, in the present instance, in view of the novel retaining structure, the cover 141 may be formed from sheet synthetic plastic material as is the outer part of the cover assembly.

To the end that the cover assembly above described may be completed and may be securely retained upon the wheel structure in easy-on, hard-off relationship, there is provided herein a novel, rigidifying, ornamental retaining means which includes an annular beaded portion 142 having a turned back radially inner edge margin 143. The radially outer margin of the axially outwardly convex bead 142 is provided with a circular shoulder 144 which merges into a generally radially outwardly extending annular portion 145. This annular portion 145 is provided at periodically spaced circumferential points with groups of generally radially outwardly extending resilient fingers 146, the outer ends of which prescribe a circle having a slightly larger diameter than that prescribed by the radially inner surface of the adjacent intermediate flange 135 of the tire rim 130. As will be seen from Figure 16, the fingers 146 extend radially outwardly, slightly axially outwardly so that they are somewhat obliquely disposed with respect to the wheel.

In assembling the above described construction the cover member 140 which is provided with a radially inner periphery slightly smaller than the circumference of the shoulder 144 of the retaining member, is first snapped into such a position that the radially inner edge thereof retainingly rests upon the shoulder 144 of the retaining annulus so that these parts form a unit which may be applied to and removed from the wheel as such.

As the parts are so assembled the operator merely aligns the retaining member concentrically with the wheel and urges the same axially inwardly so that the fingers 146 are deflected slightly axially outwardly as the outer ends thereof engage the adjacent portion of the surface of the respective intermediate flange 135. This axial inward movement is continued until the portion 144a of the retaining member abuts the adjacent portion of the outer surface of the wheel body 132 in which position it will be seen that the radially outer ends of the fingers 146 are in biting engagement with the respective flange 135 of the tire rim to prevent withdrawal of the assembly from the wheel. When in this position it will be seen that the cover member 140 is maintained upon the wheel by engagement of the radially inner edge thereof on the shoulder 144 while the radially outer edge 147 extends radially outwardly beyond the edge portion 136 of the tire rim and into abutment with the side wall of the tire a distance radially outwardly of the junction thereof with the rim. Thus the simulation of the side wall of the tire by the cover member 140 is greatly augmented. If desired, the edge 147 of the cover member 140 may be flared axially outwardly to a slight degree to present to the side wall of the tire a smooth nonabrading surface, whereby the tire is not worn and cut upon lateral flexure thereof against the cover under load bearing conditions.

The cover assembly is completed by the attachment of the central circular hub cap simulating portion 141 to the radially outer part above described. This central hub cap member includes a generally axially inwardly, radially inwardly, obliquely disposed flange 148 which terminates in a radially outwardly rolled snap-on bead 149. Preferably the underturned portion 143 of the retaining member is provided with a plurality of circumferentially spaced, circularly aligned, radially outwardly extending humps 150, these humps being arranged to receive the snap-on bead 149 at the axially inner side thereof when the cover 141 is forced axially inwardly in concentric alignment with the wheel structure.

From the foregoing it will be seen that there is provided herein a novel cover assembly including improved retaining means whereby the retaining means securely receives radially inner and outer, independent cover members and at the same time presents an intermediate, rigidifying, ornamenting bead 142 which, if the retaining member is formed from sheet stainless steel or the like, may be provided with a high luster to greatly augment the ornamental appearance of the entire cover assembly.

In the use of the above construction, if the operator desires to inflate the tire it is merely necessary to grasp the radially outer margin of the cover member 140 and flex the same radially inwardly to afford access to the valve stem 139. Similarly if it is desired to remove the entire cover assembly from the wheel structure the same manipulation of the cover member 140 is sufficient to permit the application of a pry-off tool whereby one of the sets of fingers 146 may be pried loose from the wheel, whereupon the remaining fingers may be detached from the wheel to permit removal of the entire cover assembly shown in Figure 16 as a unit. If, on the other hand, it is found necessary only to manipulate the wheel bolts which secure the bolt-on flange 133 to the brake drum or the like, the operator may apply the point of a pry-off tool behind the radially outwardly extending extremity 151 of the cover member 141 whereupon axially inner movement of the handle of the pry-off tool will withdraw the bead 149 from the respective humps 150 to permit the cover 141 to be removed from the wheel independently of the remainder of the cover assembly.

In the construction shown in Figure 17 there is also provided a cover assembly including an independent radially outer annular part 152 and a central circular hub cap simulating portion 153, the annular part 152 being formed from sheet synthetic plastic as described in conjunction with the previous embodiments and the portion 153 being formed preferably from a more rigid material such as stainless sheet steel or the like. In this construction the wheel includes a flanged, drop center type tire rim 154, such as those previously described, and a central load bearing or spider portion 155 having a flange 155a at the radially outer part thereof for attaching it to the tire rim 154 and having a bolt-on flange 156 for receiving wheel bolts whereby it may be secured to an appropriate part of the vehicle such as the brake drum or the like.

The central load bearing portion 155 includes an intermediate circular part 156 which comprises an annular protruding portion bordered on the radially outer side thereof by radially outwardly extending bumps 157 and on the radially inner side thereof by radially inwardly extending bumps 158, these bumps being circumferentially spaced and circularly aligned for purposes to be explained presently.

In the construction of Figure 17 the tire valve stem 159 may be of the character of that shown in Figure 16 or, if desired, the end of the stem may be provided with an extension 160 which is disposed in a radially outward position to facilitate the application of the nozzle of an air hose thereto.

The annular plastic cover member 152 is provided at the radially inner edge thereof with a strengthening bead 161 which defines a circle having a slightly smaller circumference than that defined by the radial outer extremities of the circularly spaced humps 157. Thus it will be seen that in applying the cover member 152 to the wheel structure, the bead 161 thereof may be snapped over the respective humps 157 and thus held in the attached relationship shown in the drawings. It has been found that this attachment operation may be accomplished in view of the elasticity of the plastic material from which the cover 152 is made. In order that the cover member 153 may be secured to the wheel structure it is provided with a radially outer extremity 162 which merges with a generally radially inwardly extending flange 163 which in turn is formed to provide an axially inwardly extending snap-on flange 164 that terminates in a snap-on bead 165. This snap-on bead preferably defines a circle having a circumference slightly larger than that defined by the circularly spaced peaks of the respective humps 158 and thus the cover member 153 may be applied to the wheel structure by aligning the same concentrically therewith and urging the same axially inwardly. During this axial inward movement the bead 165 is slightly distorted out of its circular condition until the humps have been passed, whereupon it immediately snaps into its circular configuration to assume tightly the position shown in Figure 17, wherein the flange 153 is drawn against the axial outward extremity of the central load bearing portion 155.

From the foregoing it will be seen that there is provided in the embodiment of Figure 17 an arrangement whereby a plurality of separate cover members may be secured to the wheel structure and yet wherein no auxiliary retaining member is required. In order to render the extension 160 of the tire valve stem 159 accessible it will be seen that the operator need merely grasp the radially outer portion 152a of the cover member 152 and flex the same outwardly, thereby to provide for the insertion of the nozzle. If it is desired to remove the cover member 152 from the wheel structure it will be seen that it is merely necessary to grasp this cover member at the radially outer part thereof and draw the same outwardly until the rim 161 is drawn over the humps 157. It will be understood that removal of the cover member 153 from the wheel may be accomplished in a manner similar to that described in conjunction with previously discussed embodiments of my invention.

In the construction of Figure 18 the wheel includes a tire rim part 166 and a central load bearing portion 167, the latter having a radially outer peripheral, axially inwardly extending flange 168 for securing it to the tire rim and also having at the radially inner part thereof a bolt-on flange 169 for aiding in the attachment of the wheel to the vehicle as previously described. In this assembly the central load bearing portion 167 of the wheel is provided with an annular retaining member 170 which is secured thereto as welding or riveting as shown at 171. The retaining member 170 is provided with a plurality of resilient spring clips 172 which are circularly spaced around the wheel as described in conjunction with other embodiments shown herein.

In this embodiment the cover assembly includes a radially outer cover member 173 which formed from sheet synthetic plastic material, thereby to have the attributes set forth above with respect to the radially outer cover portions of the constructions previously described. This cover member 173 as will be seen, generally simulates the configuration of the adjacent side wall of a tire 174 in the tire rim 166 and extends radially outwardly beyond the radial outer extremity of the tire rim, this outwardly extending part comprising a slightly outwardly flared flange 175 which presents a smooth working or sliding surface to the tire 174 when the latter expands laterally under load bearing conditions. The cover 173 is provided with such a radial expanse that it extends radially inwardly beyond the junction of the tire rim 166 and the central load bearing portion 167, this radially inner margin terminating in a grooved portion 176 and a generally radially inwardly, slightly curvate peripheral flange 177 which preferably is provided with a curvature similar to that of the adjacent portion of the outer surface of the load bearing portion which it supportingly abuts.

The cover assembly of Figure 18 is completed by the provision of a central circular hub cap simulating cover member 178 which is preferably formed from a more rigid material such as sheet steel or the like and, if stainless steel, this cover portion 178 may be provided with a high luster to augment the ornamental appearance of the cover assembly. The cover member 178 is provided with a central crowned portion 179 bordered radially outwardly by a corrugated portion 180 which serves to ornament the same and also serves materially to strengthen the cover against indentation. Radially outwardly of the corrugated portion 180 there is provided a generally radially outwardly extending circular beaded portion 181 which merges with a snap-on flange 182. This snap-on flange, as will be seen, extends radially inwardly and then generally axially inwardly and terminates in a snap-on bead 183 which cooperates with the spring clips 172 in the manner previously described in conjunction with other embodiments of my invention shown herein.

It will be seen that the flange 182 is provided with a curvature generally similar to that of the adjacent portion of the central load bearing part 167 and the radially inner flange 177 of the cover 173. Thus, in assembling the construction of Figure 18, the operator merely aligns the cover 173 concentrically with the wheel and then after so aligning the central cover member 178, forces the latter home in an axially inward direction so that the bead 183 cooperates with the spring clips 172 in the manner shown in the drawings.

As the cover member 178 is urged axially inwardly into engagement with the clips 172 it will be seen that the flange 182 is pressed tightly against the flange 177 of the plastic cover member 173, this flange 177 in turn being pressed tightly against the adjacent portion of the outer surface of the central load bearing part 167 of the wheel. Thus, again, there is provided a construction wherein the radially inner margin of the plastic cover member 173 serves as a resilient or compressible cushion which is interposed between the metallic cover 178 and the metallic load bearing part 167 of the wheel. It will be seen that in applying the cover assembly of Figure 18 as described above the radially outwardly extending portion 181 of the cover 178 interfits into the grooved portion 176 of the cover member 173, whereby these parts are retained together as a unit and may be applied to or detached from the wheel structure as such. It will be understood, of course, that if desired, the cover parts may be assembled together as a unit prior to their application to the wheel structure.

In removing the construction of Figure 18 from the wheel structure it will be seen that the operator need merely flex the outer part 175 of the cover member 173 radially inwardly and axially outwardly whereupon the point of a pry-off tool may be inserted between the flange 177 of the cover 173 and the adjacent portion of the outer surface of the load bearing part 167 whereupon by fulcrum action of the pry-off tool against the outermost extremity of the tire rim the point thereof draws the bead 183 out of engagement with the resilient spring clips 172.

In this construction it will be seen that the tire valve stem 174a is relatively short so that it is entirely concealed by the cover member 173. As in the construction of Figure 16, the tire valve stem 174a is rendered accessible by mere flexure of the adjacent portion of the outer plastic cover member 173 to enable the nozzle of the air hose to be applied to the valve stem.

It will be seen from the foregoing that in all forms of the invention there is provided a wheel trim member or cover member including a radially outer annular portion of thin form-sustaining plastic material which is transversely deflectable or flexible in use without permanent deformation to permit of either access to the rear of the member, as for example shown in Figure 13, or to permit of deflection of a portion of the member about the valve stem to afford access to the valve stem in introducing air therein, as shown in Figures 2 and 13. In all forms of the invention the aforesaid member extends axially and radially inwardly from the outer edge of the tire rim so as to substantially conceal an outer side of the rim and is supported in some manner at an axially inner point relative to which deflection occurs.

In some forms, the cover is stiffened at an inner part and, in other forms, it is also bearing on the body part which serves as a backing for the cover. In still other forms, such as in Figures 13 and 14, the cover is provided with a central hub cap simulating portion which is likewise made of the resiliently deflectable plastic material employed in the outer portion of the cover. The stiffening or junction point in the form of Figures 13 and 14 is located between the outer portion of the cover and the central hub cap simulating portion, the junction point of which annularly arranged portions being located substantially axially inwardly of the outer edge of the rim so that the radially outer portion of the cover appears in use to be a continuation of the side wall of the tire.

It should also be noted that the radially outer annular portion of the trim may comprise an integral component part of a cover including a central portion, as in Figures 13 and 14, or may comprise an annulus as in Figures 16 and 17. If so desired, the annular outer cover portion may be provided with a separate hub cap part, as in Figures 3, 6, 8, 9 and 18.

In addition, as pointed out in the objects, the use of synthetic plastic in the wheel trim, and particularly in the outer portion thereof, results in this portion during its use on a wheel tending to move toward the medial plane of the wheel by centrifugal force, thus causing this trim portion to move toward or to closely hug the wheel when it is rotated. This movement is possible due to the outer annular trim portion extending radially and axially inwardly from the plane of the outer edge of the tire rim toward the wheel body member, as is clearly shown in all embodiments of the invention.

I claim as my invention:

1. In a wheel structure, an annular cover member for the outer side of the wheel structure, retaining means for maintaining the cover member on the wheel structure including a portion arranged to receive the inner peripheral edge of the cover member for pivotal movement relative thereto, said cover member having resilient, flexible characteristics enabling it to be flexed substantially axially outwardly from the wheel structure by the outer peripheral edge thereof to render the rear side thereof accessible.

2. In a wheel structure including a wheel body and a multi-flange rim adapted to receive a tire, a cover for an outer side of the flanged rim and at least a part of the wheel body, including a radially outer resiliently flexible portion made of a form sustaining plastic which is deflectable without permanent deformation, said portion being of such depth as to substantially conceal the exposed side flanges of the rim and having an outer edge terminating substantially adjacent the side wall of a tire carried by the rim so as to be deflectable and also having and inner part bearing and retained on the wheel body axially inwardly of the outer edge of the rim whereby said flexible portion in use will appear to be a continuation of the curved side wall of the tire.

3. In a wheel structure including a wheel body and a multi-flange rim adapted to receive a tire, a cover for an outer side of the flanged rim and at least a part of the wheel body, including an annular resiliently flexible portion made of a form sustaining plastic which is deflectable without permanent deformation, said portion being of such depth as to substantially conceal the exposed side flanges of the rim and having an outer free edge terminating substantially adjacent the side wall of a tire carried by the rim so as to be deflectable away from the tire and also bearing and retained on the wheel body axially inwardly of the outer edge of the rim whereby said annular flexible portion in use will appear to be a continuation of the curved side wall of the tire, said cover also including a portion disposed radially inwardly of said annular flexible portion over the wheel body, and a hub cap in engagement with said radially inner cover portion.

4. In a cover structure for a wheel including tire rim and load bearing members, a radially outer portion for an outer side of the tire rim and having a flexible outer edge for disposition in a free condition at an outer edge of the rim and adjacent the tire and also having a radially and axially inner part formed to be supported and retained at the wheel load bearing member, said radially outer portion being made of form sustaining plastic material which in use of the cover on the wheel positions said outer edge so that it may be resiliently deflected relative to the wheel and said radially outer portion also possessing the physical property of returning back to the contour it had prior to the deflection of its outer edge, all without requiring removal of the cover structure from its retained engagement with the wheel at said radially inner part.

5. In a wheel cover structure, a circular wheel cover member of dished cross-sectional contour and having an intermediate indented section provided with spaced openings for cooperation with retaining means on a wheel and an annular member seated in said indented section for covering said openings and held on the wheel by retaining means projecting through said openings.

6. In a wheel cover structure, a circular wheel cover member of dished cross-sectional contour and having an intermediate indented section provided with an opening for cooperation with retaining means on a wheel and an annular member seated in said indented section for covering said opening and held on the wheel by retaining means projecting through said opening, said cover member being made of a material having the physical properties of being self-sustaining with regard to its cross-sectional shape and yet being resiliently deflectable without permanent indentation whereby an outer portion of the cover member may be manually deflected.

7. In a wheel cover structure, a circular wheel cover member of dished cross-sectional contour and having an intermediate indented section having an opening for detachable cooperation with retaining means on a wheel and an annular member seated in said indented section for covering said opening and held on the wheel by retaining means projecting through said opening, said cover member including an outer annular trim section for substantially concealing the tire rim of a wheel and a central hub cap simulating section which is transversely flexible radially inwardly of said trim section.

8. In a wheel structure including a wheel, a circular wheel cover member for disposition over said wheel and being of dished cross-sectional contour as well as having an intermediate indented section provided with spaced openings, cover retaining means on the wheel projecting through said openings, said cover also having seated in said indented section an annular ring concealing said openings and the retaining means and including an under-turned edge sprung over and into retaining engagement with said retaining means whereby the same retaining means holds both the cover member and said ring on the wheel.

9. In a wheel structure including a wheel, a circular wheel cover member for disposition over said wheel and being of dished cross-sectional contour as well as having an intermediate indented section provided with spaced openings, cover retaining means on the wheel projecting through said openings, said cover also having seated in said indented section an annular ring concealing said openings and the retaining means and including an under-turned edge sprung over and into retaining engagement with said retaining means whereby the same retaining means holds both the cover member and said ring on the wheel, said retaining means being in the form of a plurality of spaced protuberances fastened to the wheel and each having an under-cut shoulder engageable by said ring edge.

10. In a wheel structure including a load bearing member and a drop-center type of flanged tire rim having a tire thereon, a circular wheel trim member having resilient flexible characteristics such as that of synthetic plastic and of such cross-sectional contour as to substantially cover an outer side of the flanged tire rim substantially to the outer sidewall of the tire, said member being transversely curved outwardly so as to appear to be a continuation of the sidewall of the tire and having at least one of its margins reinforced by being backed up by the wheel to aid in rigidifying the member without detracting from its elasticity, said reinforced margin extending radially inward for disposition over and against the load bearing member of the wheel.

11. In a wheel structure including a load bearing member and a drop-center type of flanged tire rim having a tire thereon, a circular wheel trim member having resilient flexible characteristics such as that of synthetic plastic and of such cross-sectional contour as to substantially cover an outer side of the flanged tire rim substantially to the outer side wall of the tire, said member being transversely curved outwardly so as to appear to be a continuation of the sidewall of the tire and having at least one of its margins reinforced by being backed up by the wheel to aid in rigidifying the member without detracting from its elasticity, said reinforced margin extending radially inward for disposition over the load bearing member of the wheel and being formed into a hub cap simulating portion which is transversely flexible relative to said reenforcement.

12. In a wheel structure including a load bearing member and a drop-center type of flanged tire rim having a tire thereon, a circular wheel trim member having resilient flexible characteristics such as that of synthetic plastic and of such cross-sectional contour as to substantially cover an outer side of the flanged tire rim substantially to the outer side wall of the tire, said member being transversely curved outwardly so as to appear to be a continuation of the sidewall of the tire and having at least one of its margins reinforced by being backed up by the wheel to aid in rigidifying the member without detracting from its elasticity, said reinforced margin extending radially inward for disposton over the load bearing member of the wheel and comprising an outwardly turned central portion of a configuration to follow that of the load bearing member so as to directly bear thereon and be backed up thereby, the junction of said portion with the remainder of the trim member comprising an annular relatively sharp angular bend such that the trim member may flex relative to the backed up central reinforcing portion.

13. In a wheel structure including a load bearing member and a drop-center type of flanged tire rim having a tire thereon, a circular wheel trim member having resilient flexible characteristics such as that of synthetic plastic and of such cross-sectional contour as to substantially cover an outer side of the flanged tire rim substantially to the outer sidewall of the tire, said member being transversely curved outwardly so as to appear to be a continuation of the sidewall of the tire and having at least one of its margins reinforced by being backed up by the wheel to aid in rigidifying the member without detracting from its elasticity in its application to and from a wheel, said reinforced margn extending radially inward for disposition over the load bearing member of the wheel, said trim member comprising a radially outer annular portion substantially covering the stepped flanges of the rim and an oppositely or outwardly turned radially inner central portion which cooperates with the load bearing member to provide reinforcement for the cover, said two portions in cross section appearing as two legs with their junction bearing directly on the load bearing member so as to be backed up thereby, the radially inner portion being flexible relative to said junction, whereby the trim member can accommodate variations in the relative positions of the rim and bearing member of the wheel occasioned by the allowable manufacturing tolerances.

14. In a cover structure for a wheel including a body member and a tire receiving rim member, an annular plastic wheel trim for an outer side of the wheel and being of a generally V-shape cross section thus providing two angularly arranged legs, the innermost leg of which is formed to bear and be retained on the wheel and the outermost of which in use is manually and resiliently deflectable relative to the junction of said legs without permanently distorting the trim or necessitating its removal from the wheel.

15. In a cover structure for a wheel including a body member and a tire receiving rim member, a circular plastic wheel cover for the rim and body members of a wheel, said cover including generally angularly arranged portions, the outermost of which has a free edge manually deflectable without permanent distortion and without necessitating detachment of the cover from the wheel, the inner portion being formed over detachable securement and bearing of the body member of the wheel.

16. In a cover structure for a wheel including a body member and a tire receiving rim member, a circular plastic wheel cover for the rim and body members of a wheel, said cover including generally angularly arranged portions, the outermost of which has a free edge manually deflectable without permanent distortion and without necessitating detachment of the cover from the wheel, the inner portion being formed for detachable securement and bearing on the body member of the wheel, said portions being constructed and arranged upon being pressed axially into retained position on the wheel to adjust the cover to variations in the contour and relative position of the wheel members to be embraced by the cover.

17. In a wheel structure including a wheel having a tire rim and body parts with the body part centrally recessed to telescopically receive a hub cap, a circular wheel cover including a central resiliently flexible portion for telescoping the central recess of the wheel body part and a hub cap pressed into said central portion and inside said wheel body part recess to shape said central portion of the cover thereon to the portion of the wheel body engaged thereby, said cover including an outer annular resiliently flexible plastic portion which is manually deflectable without requiring removal of the cover from the wheel.

18. In a wheel structure including a flanged tire rim and a central load bearing portion, a circular cover assembly for the outer side of the wheel, said cover assembly including a radially outer part formed from synthetic plastic material whereby it is self-sustaining as to form yet adjustable to the shape of a portion of a relatively rigid body against which it is pressed, said outer part being arranged to substantially cover the flanges of the tire rim to substantially conceal the same and including a radially inner portion extending over a radially outer part of the central load bearing portion in supporting and surface contact therewith and means detachably engaging the wheel and arranged to press said radially inner portion into nested, conforming relationship with an adjacent part of the load bearing portion of the wheel.

19. In a wheel structure including a wheel body member and a multi-flange rim adapted to receive a tire, a cover for an outer side of the flanged rim and at least a part of the wheel body member, including a radially outer resiliently flexible portion made of a form sustaining plastic which is of such depth as to substantially conceal the exposed side flanges of the rim and having an outer edge terminating adjacent an edge of the rim so as to be deflectable away from the rim and also having an inner part bearing and retained on the wheel body member axially inwardly of the outer edge of the rim whereby said radially outer portion in use will appear to be a continuation of the curved side wall of the tire, and means forming a detachable snap-on engagement between the wheel body member and the cover for holding said cover inner part in tight bearing contact with the wheel body member.

20. In a wheel structure including a wheel having a multi flange tire carrying rim and a central load supporting member, said rim having a valve stem extending from one of the outer side flanges thereof, a circular resiliently flexible plastic wheel trim covering outer side flanges of said rim between an outer edge of the rim and said load supporting member and provided with a valve stem the portion of said trim about said opening being deflectable to render the valve stem accessible without necessitating removal of said trim from the wheel, said deflectable portion upon release returning back of its own accord to its original contour.

21. In a cover structure for a wheel including a wheel body member and a multi-flanged rim adapted to receive a tire, a cover for substantially covering an outer side of the flanged rim formed to be retained on the wheel and including a radially outer resilient flexible portion made of a form-sustaining plastic of such depth as to conceal substantially the exposed side flanges of the rim, said portion being transversely deflectable without detachment from the wheel and being returnable back of its own accord to its original contour, said cover also having a radially and axially inner portion for detachable engagement with the wheel.

22. In a cover structure for a wheel including tire rim and body parts, a circular wheel trim of light weight for attachment to an outer side of the wheel, comprising an annular portion of thin plastic material and which is self-sustaining but transversely resiliently deflectable, said portion having a radially inner part offset substantially radially and axially inwardly toward the body part from the outer margin of said portion and said portion being flexible from said inner part outwardly to afford access to its rear and whereby its outer margin tends to move by centrifugal force toward the wheel, said portion being of curved cross section, the curvature of which corresponds generally to that of a side wall of a tire on the rim part so that in use on a wheel said portion will appear to be a radially inner continuation of the side wall of the tire.

23. As an article of manufacture, a wheel cover for a wheel including a multi-flanged rim adapted to carry a tire and a wheel body, said cover comprising three parts including a plastic trim ring for covering the exposed surfaces of the flanges of said rim, a central hub cap for disposition over the central part of the wheel body and an exposed intermediate metal ring for holding said parts together on the wheel, said intermediate ring being provided with generally radially extending resilient fingers positioned behind the trim ring for resilient gripping engagement of one of the tire rim flanges to hold the cover on the wheel, said trim ring being made of a plastic material that is self-sustaining as to form so as to cause said trim ring to have a predetermined arcuate configuration and also being resiliently resistant to permanent deformation, the outer edge of said trim being arranged to extend beyond the tire rim along a side wall of the tire and being manually engageable for the purpose of deflecting the trim ring to enable the application of a pry-off tool therebehind in the ejection of the cover from the wheel.

24. As an article of manufacture, a cover assembly for disposition over the outer side of a wheel structure, said cover assembly including a metallic ring, a radially outer plastic trim ring and a central circular hub cap simulating member and having means for retainingly engaging a part of the wheel structure, said metallic ring also having radially inner and outer portions arranged to respectively receive the radially outer margin of the hub cap member and the radially inner margin of the plastic trim ring to retain said parts concentrically together over the wheel structure.

25. In a wheel structure including a multi-flanged tire rim and a body part, a wheel cover retaining ring including a cover retaining part and wheel engaging means, said ring being retained solely by its engagement with the flanged tire rim and said cover retaining part thereof having a free portion projecting laterally from the wheel body part and formed into a cover retaining shoulder, and a flexible cover ring for concealing the outer flange of the rim and having an inner margin detachably snapped over and into retained engagement with said shoulder.

26. In a cover assembly for disposition over the outer side of a wheel structure, a resiliently flexible, relatively frangible, annular cover member and a relatively rigid circular retaining member having means for detachably engaging a wheel and a radially outwardly opening circular groove formed therein, said annular cover member having means at the inner periphery thereof for engaging in said circular groove to retain the same on said relatively rigid member and to afford axial outward, local flexure of said annular cover member.

27. In a wheel structure, a circular cover for disposition over the outer side thereof, retaining means for maintaining the cover on the wheel structure including an attachment portion arranged for attaching engagement with the wheel structure and a portion arranged to extend beyond the wheel cover to afford an ornamental trim for the wheel structure, said retaining means being so cross-sectionally configurated as to provide an axially outwardly extending face for receiving a part of the wheel cover in detachable engagement.

28. In a wheel structure, an annular cover for disposition over the outer side thereof, retaining means for maintaining the cover on the wheel structure including an attachment portion arranged for attaching engagement with the wheel structure and a portion arranged to extend beyond the cover member to afford an ornamental trim for the wheel structure, said retaining means including an intermediate portion disposed to receive the inner peripheral edge of the annular cover member in detachable engagement.

29. In a wheel structure, an annular cover member for disposition over the outer side of the wheel structure, retaining means for maintaining the cover on the wheel structure including a portion arranged to receive the inner peripheral edge of the cover member for pivotal movement relative thereto, said cover member having resilient, flexible characteristics enabling it to be flexed substantially axially outwardly from the wheel structure by the outer peripheral edge thereof to render the rear side thereof accessible.

30. In a wheel structure, a multi-part cover for disposition over the outer side thereof, said cover including an outer annular part and a central hub cap part, retaining means for maintaining the cover parts on the wheel structure including an annular retaining portion cross-sectionally configurated to include at a radially outer part thereof, means for receiving the inner peripheral edge of the outer cover members, and at a radially inner part thereof means for attachably receiving the central hub cap member, the intermediate part of the annular portion of said retaining means being arranged to bridge an annular space between said cover part to afford an ornamental trim for the wheel structure.

31. In a wheel structure, retaining means for maintaining a multi-part cover assembly including an outer annular part and a central hub cap part over the outer side of a wheel structure, said means including an annular retaining portion to overlie a part of the outer surface of the structure to ornament the same and including means for receiving the inner peripheral margin of the outer cover member, and means at the radially inner margin thereof for receiving the outer peripheral portion of said central hub cap part, said last named means including a plurality of substantially radially inwardly extending spaced humps.

32. In a wheel structure, retaining means for maintaining over the outer side of a wheel structure an annular cover member having elastically, resiliently flexible characteristics and a cross-sectional configuration of such shape and magnitude that it extends over a part of the wheel structure to conceal the same and constitutes in effect a continuation of a side wall of a tire mounted on the wheel structure, and retaining means including a part engageable with a wheel structure and a substantially axially extending surface for receiving the inner peripheral edge of the cover member for pivotal movement relative thereto during flexure of an outer peripheral part of the cover member to render the rear side thereof accessible.

33. In a wheel structure, a circular cover member for disposition over the outer side thereof, said cover member having resilient, flexible characteristics such as that of synthetic plastic or rubber and having a cross-sectional configuration of such shape and magnitude that it extends over the outer side of the wheel and constitutes in effect a continuation of the side wall of a tire mounted on the wheel structure to give the appearance of being a part of said tire, said cover member being resiliently flexible from a radially outer part thereof to be flexed axially outwardly relative to the wheel to render the rear side thereof accessible and including a radially inwardly disposed attachment portion, retaining means for maintaining the cover on the wheel structure including a retaining portion for receiving the attachment portion of the cover in attaching engagement and for pivotal movement of said attaching portion relative thereto.

34. In a wheel structure, a circular cover for disposition over the outer side thereof, said cover having resilient, flexible characteristics enabling it to be locally flexed away from the wheel structure to render the rear side thereof accessible and having a cross-sectional configuration of such shape and magnitude that, when secured to the wheel structure, it constitutes in effect a continuation of the side wall of a tire in the wheel structure and including an attachment portion disposed radially inwardly thereof, and attaching means for receiving the attaching portion of the cover member for pivotal movement during flexure of the cover member to render the rear side thereof accessible.

35. In combination, a wheel having a tire rim, a wheel cover assembly including an outer annular part and a central crown part and a retaining member, formed separately from said cover parts and securable to said wheel for retaining the cover assembly thereon, said retaining member including a ring having a portion for retainingly engaging the inner periphery of said outer annular cover part and a portion for retainingly engaging the outer periphery of said central crown part to retain said parts in disposition over the outer side of the wheel.

36. In a wheel structure having a tire rim and a central load bearing portion, a cover assembly for disposition over the outer side of the wheel and retaining means for securing said assembly to the wheel, said cover assembly including a central circular part and an outer annular part, said central part and said outer part being formed at the radially outer and inner portions thereof respectively to engage said retaining means, said retaining means having a portion securable to the wheel and a portion constructed for disposal between the parts of said cover assembly, said last named portion being formed separately from and arranged to receive said cover parts in retaining engagement.

37. In a wheel structure having a tire rim and a central load bearing portion, a cover assembly including a trim ring and a central hub cap member for disposition over the outer side of the wheel in concentric relationship to one another, said ring and hub cap members having juxtaposed edges, and a separately formed, retaining ring having a concealed part securable to the wheel and a part arranged to cooperate with the juxtaposed edges of said cover parts for retaining engagement therewith.

GEORGE ALBERT LYON.